UNITED STATES PATENT OFFICE.

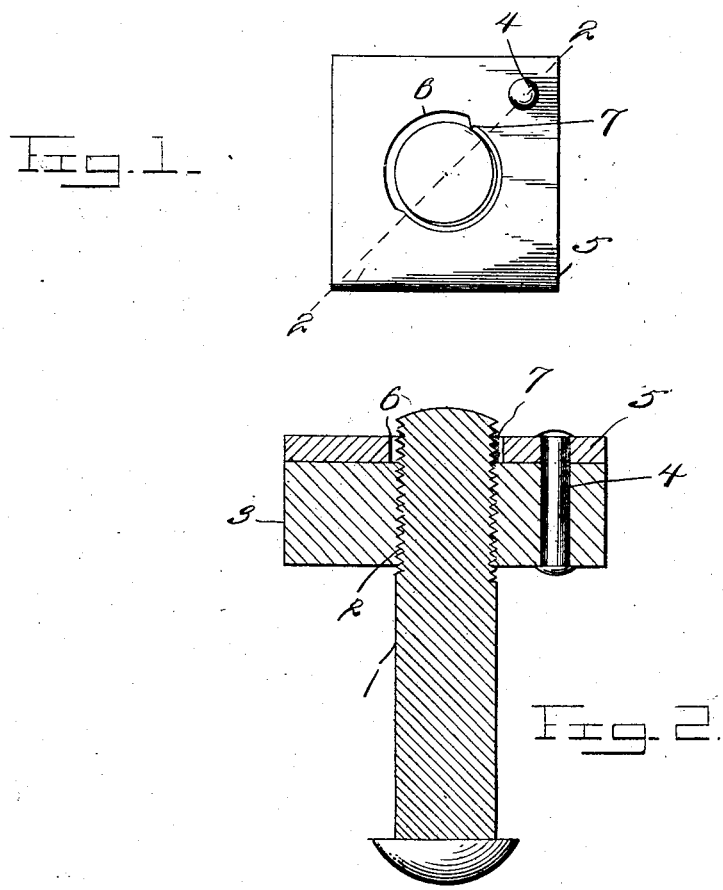

WILLIAM H. SNAVELY, OF SPRING MILLS, PENNSYLVANIA.

NUT-LOCK.

No. 912,499.      Specification of Letters Patent.      Patented Feb. 16, 1909.

Application filed August 4, 1905. Serial No. 272,674.

*To all whom it may concern:*

Be it known that I, WILLIAM H. SNAVELY, a citizen of the United States, residing at Spring Mills, in the county of Center, State of Pennsylvania, have invented certain new and useful Improvements in Nut-Locks; and I do hereby declare the following to be a full, clear, and exact description of the invention, such as will enable others skilled in the art to which it appertains to make and use the same.

This invention relates to nut locks.

One object of the invention is to provide a nut lock embodying such characteristics that back-turning of the nut upon the bolt is prevented.

Another object of the invention resides in the provision of an exceedingly simple, inexpensive, durable and efficient means adapted for the purposes stated.

With these and other objects in view the present invention consists in the combination and arrangement of parts as will be hereinafter more fully described, shown in the accompanying drawings and particularly pointed out in the appended claim, it being understood that changes in the form, proportion, size and minor details may be made, within the scope of the claim, without departing from the spirit or sacrificing any of the advantages of the present invention.

In the drawings:—Figure 1 is a top plan view of a nut lock embodying the present invention. Fig. 2 is a longitudinal section on line 2—2 of Fig. 1.

Referring now more particularly to the accompanying drawings, the reference character 1 designates a bolt provided with screw-threads 2, upon which threads the nut 3 is adapted to work longitudinally of the bolt.

By means of a suitable pivot pin 4, which pierces the nut 3, at one of its corners, is swingingly mounted a lock plate 5 provided with a circular opening 6. A part of the opening has its diameter enlarged and at one end of the enlarged portion is formed a tooth 7, which tooth normally lies in engagement with the threads 2 of the bolt 1, to prevent backward movement of the nut 3 upon the bolt. By enlarging the bore of the plate in advance of the tooth 7, sufficient movement of the plate can be had to assure an operative engagement of the tooth with the bolt.

As shown in the drawings, the lock plate 5 corresponds in size and shape with the nut 3, covering the entire upper face thereof when in place, the opening 6 in said plate registering with the opening in the nut, both said nut and said plate having plane faces. When it is desired to permit backward movement of the nut 3 upon the bolt 1, it is simply necessary to swing the lock plate 5 upon its pivot 4 so that the tooth 7 of the lock plate will not engage the threads of the bolt. It will be observed that the opening 6 of the lock plate 5 is not only of peculiar formation and not threaded, but is of larger cross-sectional diameter than the cross-sectional diameter of the bolt 1, thereby permitting the aforesaid pivotal movement of the lock plate. Further, it will be noted that the projection of the tooth 7 is in the direction of the line 2—2 in Fig. 1, passing through the centers of the pivot and the opening of the nut so that when the plate is moved in one direction upon the pivot, the tooth is caused to bite into the threads of the bolt.

It is to be noted that the sides of the plate 5 are coextensive with and of the same number as the sides of the nut, and when said plate is in position to be revolved said sides are flush with the sides of the nut. The manner of using the device is as follows: When it is desired to screw the nut upon the bolt a wrench is so positioned as to grasp both the plate 5 and the nut 3 between its jaws. This holds the locking teeth out of contact with the threads of the nut. The nut is then turned to proper position and the wrench raised to grasp only the plate 5 which is then turned to force the engaging tooth into contact with the threads of the bolt. When it is desired to unlock the nut, the plate is turned back till the edges are flush and the wrench positioned as in turning the plate on. The nut may then be readily turned off of the belt.

What is claimed is:

A nut lock comprising a nut engaging a bolt, a plate conforming in outline with and of the same size as the nut and bearing thereon, means for swingingly connecting the plate to the nut, said plate formed with a central aperture larger than the bolt and through which the bolt extends and with a tooth extending into the aperture and biting into the threads of the bolt when the plate is disposed in position to register with the nut, and releasable when the plate is rotated independently of the nut, whereby a wrench with the same jaw opening may be employed to operate the nut and to release the plate.

In testimony whereof, I affix my signature, in presence of two witnesses.

WILLIAM H. SNAVELY.

Witnesses:
W. H. GROVE,
E. J. BEARD.